US008037493B2

(12) United States Patent
Migos

(10) Patent No.: US 8,037,493 B2
(45) Date of Patent: Oct. 11, 2011

(54) MODULAR REMOTE CONTROL AND USER INTERFACES

(75) Inventor: Charles J. Migos, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 491 days.

(21) Appl. No.: 11/811,672

(22) Filed: Jun. 11, 2007

(65) Prior Publication Data

US 2008/0307459 A1     Dec. 11, 2008

(51) Int. Cl.
 *G06F 3/00* (2006.01)
(52) U.S. Cl. .............................. 725/39; 725/44; 725/45
(58) Field of Classification Search .................... None
 See application file for complete search history.

(56) References Cited

U.S. PATENT DOCUMENTS

| 6,133,847 | A | 10/2000 | Yang |
| 6,501,516 | B1 * | 12/2002 | Clapper ........................ 348/734 |
| 2001/0011953 | A1 | 8/2001 | Shintani et al. |
| 2004/0070491 | A1 | 4/2004 | Huang et al. |
| 2004/0070516 | A1 | 4/2004 | Nielsen |
| 2004/0168206 | A1 * | 8/2004 | Stienstra ........................ 725/139 |
| 2005/0052423 | A1 | 3/2005 | Harris et al. |
| 2006/0087433 | A1 | 4/2006 | Sheller |
| 2006/0152401 | A1 | 7/2006 | Spilo |
| 2006/0259930 | A1 * | 11/2006 | Rothschild ........................ 725/81 |

FOREIGN PATENT DOCUMENTS

WO        WO 0065553 A1 *  11/2000

OTHER PUBLICATIONS

"Harmony Remote Controls", http://www.logitech.com/index.cfm/products/features/harmony/US/EN,CRID=2078.
"Universal Remote Control", http://www.universalremote.com/whats_new/.
Mike, "Remote Buddy allows the Wii remote to be used with Bluetooth Macs", http://www.macmegasite.com/node/3340.

* cited by examiner

*Primary Examiner* — William Trost, IV
*Assistant Examiner* — Chenea Smith

(57) ABSTRACT

Techniques are described to customize the functional capabilities of a remote control device with one or more modular hardware components. In an implementation, a modular hardware component coupled to a remote control device is identified. A user interface is configured according to the identified modular hardware component and/or the functional capabilities of the identified modular hardware component. The configured user interface corresponds to the modular hardware component and is operable via inputs or data provided through user manipulation of the modular hardware component.

20 Claims, 10 Drawing Sheets

MODULAR REMOTE CONTROL AND USER INTERFACES

BACKGROUND

The range of television content that is available to users is ever increasing. For example, users initially received television content from an over-the-air broadcast which was captured by an antenna. Subsequently, delivery techniques and the content available via these techniques have continued to expand, from cable television to digital cable television, satellite television, and so on. As these techniques have expanded so to has the amount of content available to users such that users that were initially provided with a handful of channels via the over-the-air broadcast are now able to access hundreds of channels that may have different types of television content, such as television programs, video-on-demand, and so forth.

One technique that has been developed to help the users navigate through this vast amount of content is through the use of an electronic program guide (EPG). The EPG provides functionality similar to a printed program guide by informing the users as to which television content is available and where that television content is located, e.g., what channel is broadcasting the particular television content. The EPG may also provide additional functionality to enable users to actually navigate to particular television content represented in the EPG, cause the content to be recorded by a digital video recorder, order pay-per-view content, and so on.

To enable the users to locate, select, view and/or record particular television content of interest, techniques were developed to interact with the EPG and particular television content of interest, such as using input from a remote control to navigate the EPG and select different channels. These techniques, however, were limited in that both the functionality of the remote control and the EPG were fixed at the time of manufacture. Therefore, the user was unable to customize the functional capability of a remote control to interact with an EPG and/or content according to preferred input techniques, which may be frustrating to the user and detract from the user experience.

SUMMARY

Techniques are described to customize the functional capabilities of a remote control device with one or more modular hardware components. In an implementation, a modular hardware component coupled to a remote control device is identified. A user interface is configured according to the functional capabilities of the identified modular hardware component. The configured user interface corresponds to the modular hardware component and is operable via inputs or data provided through user manipulation of the modular hardware component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
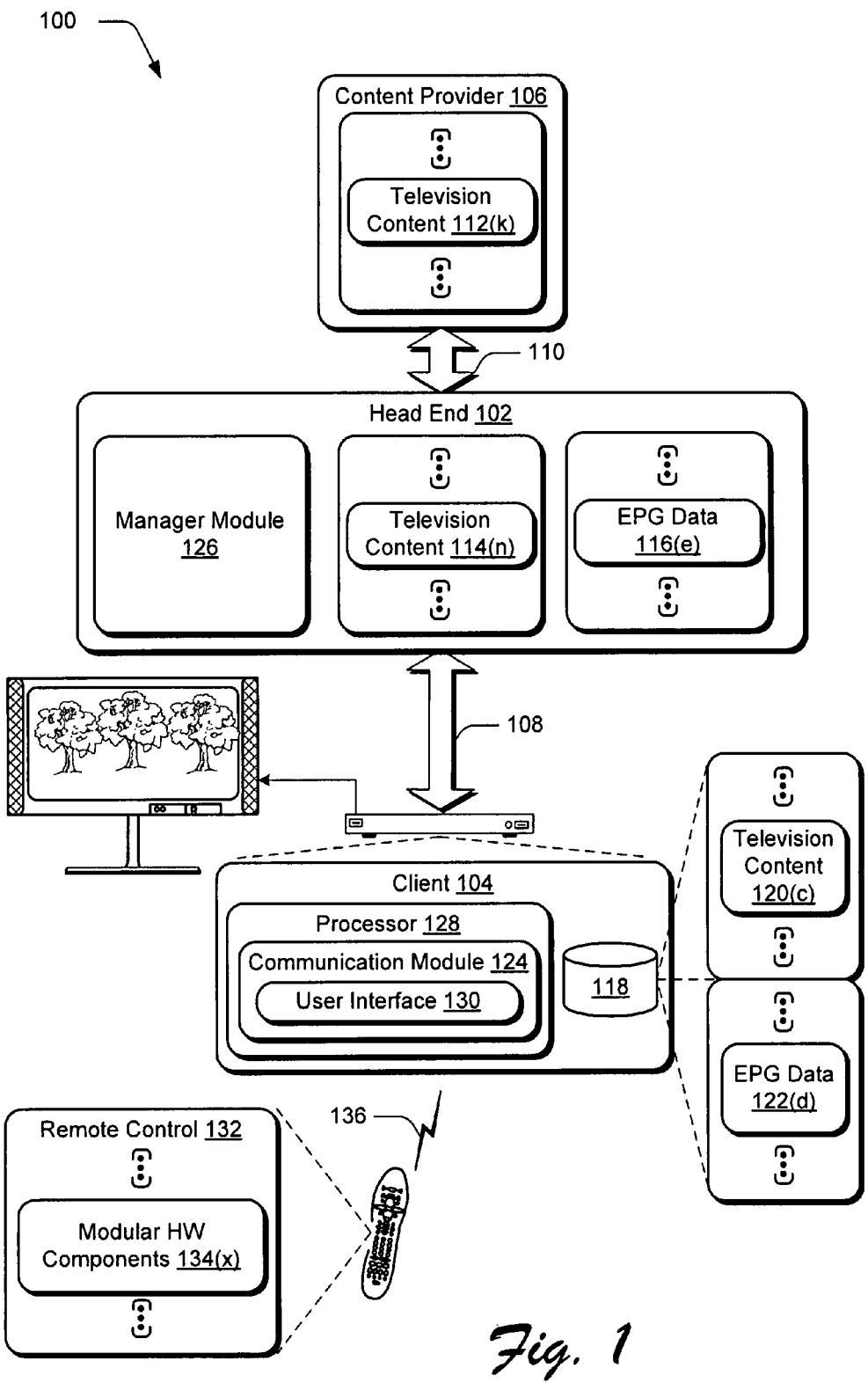
FIG. 1 is an illustration of an environment in an exemplary implementation that is operable to employ techniques related to a remote control device configured to receive one or more modular hardware components.

Traditional electronic program guides (EPGs) were configured to interact which television content, such as to locate and select television content, perform searches, and so forth. The functionality of remote control devices provided to operate these traditional EPGs was fixed at manufacture. Thus, a user was limited to input techniques and user interfaces which may be included with the remote control and client "out of the box". Accordingly, the user was not able to customize the remote control and/or corresponding user interfaces (e.g., EPG) to interact with television content, which was often frustrating to the users and detracted from the user experience.

Techniques are described in which one or more modular hardware components may be used with a remote control device to add to or enhance the functional capabilities of the remote control device. A client being operated via the remote control device may identify one or more modular hardware components used with the remote control device. Then, the client may configure a user interface based upon the modular hardware components of the remote control that the client identifies. The configured user interface may then be output and operated through user manipulation of the one or more modular hardware components of the remote control device.

For instance, a remote control device having one or more modular hardware components may be operable by a user to control a client configured to provide a variety of interactions with television content. A variety of examples of modular hardware components and remote control devices configured to receive the modular hardware components are discussed in FIGS. 3 and 4 respectively. The user, for instance, may manipulate the remote control device to power on the client which causes a "power on" command to be communicated to the client. A communication module of the client may receive the command and execute a discovery module to identify which modular hardware components are provided with the remote control. In an implementation, each modular hardware component may include an identifier which is provided to the client automatically with the "power on" command or in one or more separate communications.

The communication module of the client may then cause a user interface to be configured based upon which modular hardware components are identified. For example, when a four-way directional input device is identified, an electronic programming guide (EPG) output by the client may be configured as a grid which is responsive to four-way directional inputs. However, if a horizontal thumb-wheel is provided instead, then the EPG may be configured for horizontal scrolling. In another example, when an alphanumeric keyboard is identified, search functionality of the EPG may be configured for direct textual inputs. However, when the alphanumeric keyboard is exchanged for a numeric keypad, the search functionality may be configured differently such as to use a list of terms that are selectable by number. Thus, a user interface may be output which is configured according to which modular hardware components are identified and/or the functional capabilities of those modular hardware components. A variety of examples of user interfaces which may be configured based upon which modular hardware components are identified as being used with a remote control device are provided in FIGS. 5-8.

In the following discussion, an exemplary environment is first described that is operable to perform techniques related to a remote control device configured to receive one or more modular hardware components. Exemplary procedures are then described that may be employed in the exemplary environment, as well as in other environments. Although these techniques are described as employed within a television environment in the following discussion, it should be readily apparent that these techniques may be incorporated within a variety of environments without departing from the spirit and scope thereof.

Exemplary Environment

FIG. 1 is an illustration of an environment 100 in an exemplary implementation that is operable to employ techniques related to a remote control device configured to receive one or more modular hardware components. The illustrated environment 100 includes a head end 102 of a network operator, a client 104 and a content provider 106 that are communicatively coupled, one to another, via network connections 108, 110. In the following discussion, the head end 102, the client 104 and the content provider 106 may be representative of one or more entities, and therefore reference may be made to a single entity (e.g., the client 104) or multiple entities (e.g., the clients 104, the plurality of clients 104, and so on). Additionally, although a plurality of network connections 108, 110 are shown separately, the network connections 108, 110 may be representative of network connections achieved using a single network or multiple networks. For example, network connection 108 may be representative of a broadcast network with back channel communication, an Internet Protocol (IP) network, and so on.

The client 104 may be configured in a variety of ways. For example, the client 104 may be configured as a computer that is capable of communicating over the network connection 108, such as a desktop computer, a mobile station, an entertainment appliance, a set-top box communicatively coupled to a display device as illustrated, a wireless phone, and so forth. For purposes of the following discussion, the client 104 may also relate to a person and/or entity that operate the client. In other words, client 104 may describe a logical client that includes a user, software and/or a machine.

The content provider 106 includes one or more items of television content 112(k), where "k" can be any integer from 1 to "K". The television content 112(k) may include a variety of data, such as television programming, video-on-demand (VOD) files, and so on. The television content 112(k) is communicated over the network connection 110 to the head end 102. In the following discussion, television content may also be referred to simply as "content".

Television content 112(k) communicated via the network connection 110 is received by the head end 102 and may be stored as one or more items of television content 114(n), where "n" can be any integer from "1" to "N". The television content 114(n) may be the same as or different from the television content 112(k) received from the content provider 106. The television content 114(n), for instance, may include additional data for broadcast to the client 104.

One example of this additional data is illustrated in FIG. 1 as electronic program guide (EPG) data 116(e), where "e" can be any integer from one to "E". The EPG data 116(e) may be obtained from an EPG database for broadcast to the client 104, such as through use of a carousel file system. The carousel file system repeatedly broadcasts the EPG data over an out-of-band (OOB) channel to the client 104 over the network connection 108. Distribution from the head end 102 to the client 104 may be accommodated in a number of ways, including cable, radio frequency (RF), microwave, digital subscriber line (DSL), satellite, via Internet Protocol (IP) connection, and so on. Although the EPG data 116(e) is illustrated as being provided by the head end 102 for the sake of simplicity of the figure, it should be readily apparent that the EPG data 116(e) may originate from a wide variety of sources, such as a stand alone third-party provider.

The client 104, as previously stated, may be configured in a variety of ways to receive the television content 114(n) and the EPG data 116(e) over the network connection 108. The client 104 typically includes hardware and software to transport and decrypt content 114(n) and the EPG data 116(e) received from the head end 102 for rendering by a display device as illustrated. Although a display device is shown, a variety of other output devices are also contemplated, such as speakers.

The client 104 may also include digital video recorder (DVR) functionality. For instance, the client 104 may include memory 118 to record television content 114(n) as television content 120(c) (where "c" can be any integer from one to "C") received via the network connection 108 for output to and rendering by the display device. The memory 118 may be configured in a variety of ways, such as a hard disk drive, a removable computer-readable medium (e.g., a writable digital video disc), semiconductor based memory, and so on. Thus, television content 120(c) that is stored in the memory 118 of the client 104 may be copies of the television content 114(*n*) that was streamed from the head end 102. Additionally, the memory 118 may also be used to store EPG data 116(*e*) as EPG data 122(*d*), where "d" can be any integer from one to "D".

The client 104 includes a communication module 124 that is executable on the client 104 to control content playback on the client 104, such as through the use of one or more "command modes", i.e., "trick modes", to tune to a particular channel, order pay-per-view content, and so on. The command modes may provide non-linear playback of the content 120(*c*) (i.e., time shift the playback of the content 120(*c*)) such as pause, rewind, fast forward, slow motion playback, and the like.

The head end 102 is illustrated as including a manager module 126. The manager module 126 is representative of functionality to configure television content 114(*n*) for output (e.g., streaming) over the network connection 108 to the client 104. The manager module 126, for instance, may configure content 112(*k*) received from the content provider 106 to be suitable for transmission over the network connection 108, such as to "packetize" the content for distribution over the Internet, configuration for a particular broadcast channel, map the television content 112(*k*) to particular channels, and so on.

Thus, in the environment 100 of FIG. 1, the content provider 106 may broadcast the television content 112(*k*) over a network connection 110 to a multiplicity of network operators, an example of which is illustrated as head end 102. The head end 102 may then stream the television content 114(*n*) over a network connection to a multitude of clients, an example of which is illustrated as client 104. The client 104 may then store the television content 114(*n*) in the memory 118 as television content 120(*c*) and/or render the television content 114(*n*) immediately for output as it is received, such as when the client 104 is configured to include digital video recorder (DVR) functionality.

The client is illustrated as executing the communication module 124 on a processor 128, which is also storable in memory 118. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 118 is shown for the client 104, a wide variety of types and combinations of memory may be employed, such as random access memory (RAM), hard disk memory, removable medium memory, and other types of computer-readable media.

The communication module 124 is also illustrated as outputting a user interface 130. User interface 130 may be configured in a variety of ways to provide various interactions with client 104 to a user. For instance, a user interface 130 may be configured to display television content 120(*c*), arrange EPG data 122(*d*), expose interactive windows, and combinations thereof. Communication module 124 may be further representative of functionality that may be employed to generate, configure, and manage one or more user interfaces 130 to provide the various interactions.

In an embodiment, a user interface 130 may incorporate an electronic programming guide (EPG) which is output based on the EPG data 122(*d*). For instance, the communication module 124 may receive EPG data 116(*e*) from the head end 102 (e.g., directly and/or from memory 118 as EPG data 122(*d*)) and process the data to create and output an EPG. It is noted that the user interface 130 may also be configured to display the EPG at the same time as television content 120(*c*), such as in different portions of the user interface 130, using overlays, and so forth. Thus, a user interface 130 may be formed to combine and arrange television content 120(*c*) and EPG data 122(*d*).

The communication module 124 may also provide additional functionality related to interaction of a user with the EPG and/or television content 120(*c*). For instance, FIG. 1 depicts a remote control 132 device which is configured to receive one or more of a plurality of modular hardware components 134(*x*), where x may be any integer from one to "X". The remote control 132 device, responsive to manipulation by a user, is further configured to provide a variety of commands, data, and/or other inputs to the client 104 to control operation of the client 104. The one or more of a plurality of modular hardware components 134(*x*) are connectable to the remote control 132 device to provide added functional capabilities, further discussion of which may be found in relation to the following figures.

In an embodiment, the communication module 124 is configured to receive commands, data, inputs, and/or other information from remote control 132 device, such as via connection 136. Communication between a remote control 132 device and the communication module 124 may occur wirelessly via connection 136. For instance, connection 136 may be configured according to a variety of communication protocols such as radio frequency (RF), infrared (IR), Institute of Electrical and Electronics Engineers, Inc. (IEEE) 802.11 wireless standards, and/or other suitable communication protocols. A wired connection 136 such as universal serial bus (USB), a wired network connection, Ethernet cable, fiber optic cable, and so forth is also contemplated. The received commands, data, and/or other inputs may be formed through manipulation of the remote control 132 device by a user interacting with a user interface 130. User interface 130 may be output by the communication module 124 for display to the user, such as on the illustrated display device. Thus, the remote control 132 device may interact with client 104 via the communication module 124 to navigate through an EPG, interact with a user interface 130, select television content 120(*c*), and so on.

In an embodiment, configuration of the user interface 130 is based upon which of the plurality of modular hardware components 134(*x*) are coupled to the remote control 132 device interacting with the client 104, and/or the added functional capabilities which are provide to the remote control 132 device thereby. For instance, the communication module 124, based on data obtained via connection 136, may operate to determine which of the plurality of modular hardware components 134(*x*) are coupled to the remote control 132 device. Based on this determination, a corresponding user interface 130 is configured for output by the client 104.

More particularly, one of the modular hardware components 134(*x*) may add particular functional capabilities to the remote control 132 device and may cause a corresponding user interface 130 to be output by the communication module 124, which takes advantage of the added capabilities. In a simple example, assume one of the modular hardware components 134(*x*) is configured as a single right directional arrow. In this example, an EPG (e.g., user interface 130) output by the client 104 may be configured for navigation using right directional inputs. For instance, EPG might be arranged in a row or in multiple rows of data that scroll horizontally as the right directional arrow is manipulated by a user. Other directional inputs (e.g., vertical navigation) may be avoided in configuration of the EPG, such that the EPG corresponds to the functional capabilities of the remote control 132 device. A variety of modular hardware components 134(x) that add various functional capabilities to a remote control 132 device and corresponding user interfaces 130 are contemplated, further discussion of which may be found in relation to the following figures.

It should be noted that one or more of the entities shown in FIG. 1 may be further divided (e.g., the head end 102 may be implemented by a plurality of servers in a distributed computing system), combined (e.g., the head end 102 may incorporate functionality to generate the EPG data 116(e)), and so on and thus the environment 100 of FIG. 1 is illustrative of one of a plurality of different environments that may employ the described techniques.

Generally, any of the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the techniques to provide modular hardware components with a remote control are platform-independent, meaning that the techniques may be implemented on a variety of commercial computing platforms having a variety of processors.

Figure 2:
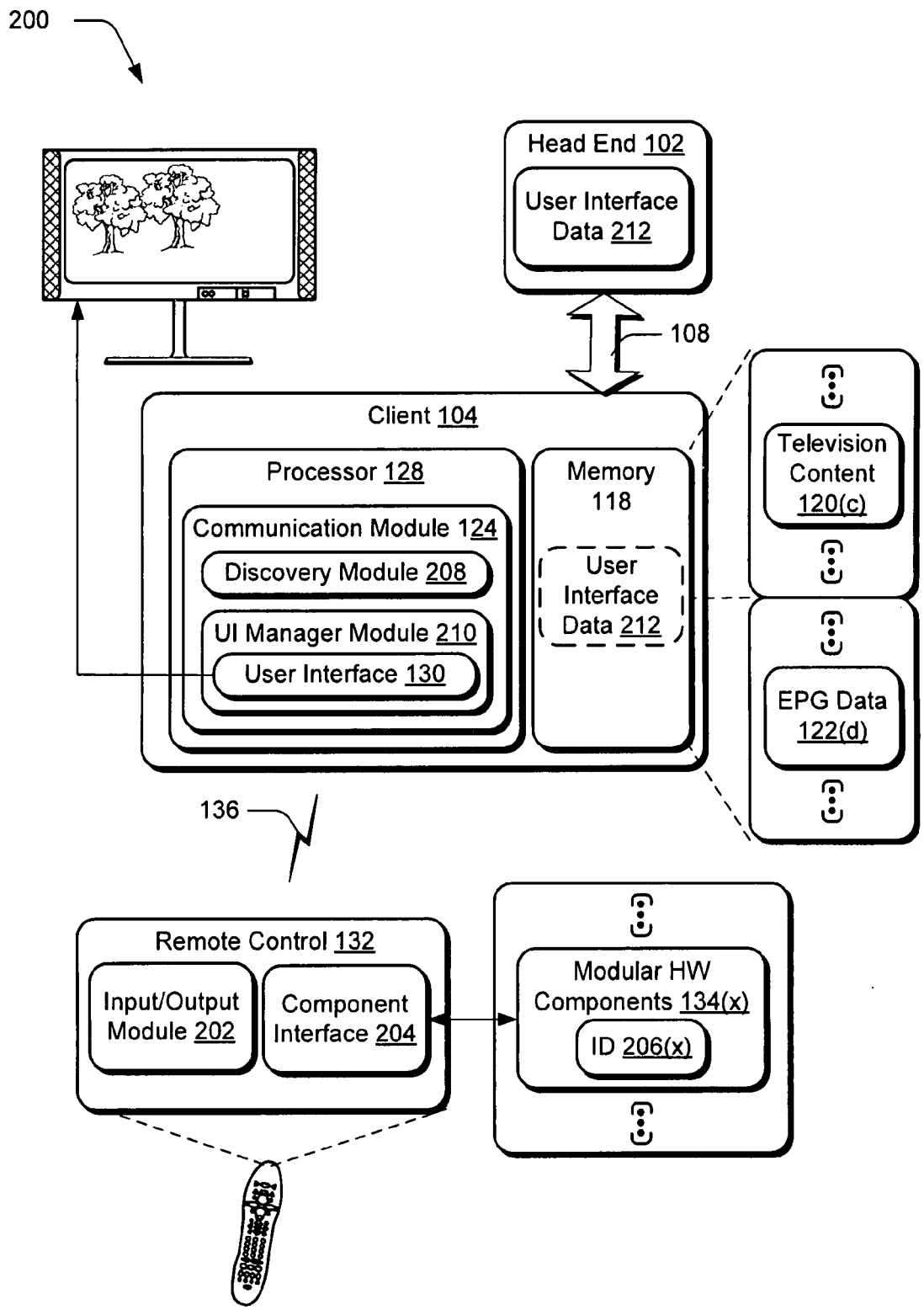
FIG. 2 is an illustration of an embodiment of an exemplary system, showing aspects of the client and remote control of FIG. 1 in greater detail.

FIG. 2 is an illustration of an embodiment of an exemplary system showing aspects of the client and remote control of FIG. 1 in greater detail. The remote control 132 device in the example of FIG. 2 is depicted as including an input/output module 202 which is representative of functionality to manage communication between the remote control 132 device and the client 104. For instance input/output module 202 may be configured to process a variety of input/output data, such as data generated from manipulation of the remote control 132 device by a user (e.g., operating buttons, components, and so on); form commands, data, inputs, and/or other information for communication to client 104; communicate commands, data, inputs and/or other information to the client 104 via connection 136; receive and process data from the client 104 (e.g., feedback signals for operation of a feedback device which may be included with the remote control 132 device); and so forth. Input/output module 202 may incorporate a transmitter and/or receiver to perform the communication. Thus, input/output module 202 represents the primary communication functions to remotely operate a client 104 and/or to manage one or more of a plurality of modular hardware components 134(x).

Remote control 132 device further includes a component interface 204 which is configured to couple the remote control 132 device to one or more of a plurality of modular hardware components 134(x). The component interface 204 may also incorporate functionality to communicate with and manage modular hardware components 134(x) such as drivers, controllers and so forth. The component interface 204 may be implemented in a variety of ways including, but not limited to: serial and/or parallel interface, pin connector interface, a software interface, a universal serial bus (USB) port, or other suitable component connection. The component interface 204 is configured to permit modular hardware components 134(x) to be coupled and decoupled from the remote control 132 device.

While a component interface 204 is illustrated as provided with a remote control 132 device, in an embodiment, modular hardware components 134(x) may also include respective component interface(s) 204 such that different modular hardware components 134(x) may be interconnected one to another. In this example, modular hardware components 134(x) may be configured as interconnecting functional building blocks; which may be pieced together in various combinations. A variety of connectors and techniques are contemplated to interconnect modular hardware components 134(x) one to another via one or more component interface(s) 204.

Thus, the modular hardware components 134(x) are "modular" in the sense that they may be interconnected, plugged-in, joined together, removed, interchanged, combined, and so forth in various combinations to form a remote control 132 device with a wide range of functional capabilities. Each of the modular hardware components 134(x) is illustrated as including a respective identifier 206(x) which may used to determine which of the modular hardware components 134(x) are interconnected at a particular time to form a remote control 132 device. A variety of modular hardware components 134(x) are contemplated further discussion of which may be found in relation to FIG. 3.

It is further noted that remote control 132 device may be considered a particular implementation of a modular hardware component 134(x) which includes certain remote control functions, such as the input/output module 202 and/or particular structural aspects such as a housing suitable to receive other modular hardware component 134(x). Thus, depicted remote control 132 device may represent a "starter" modular hardware component 134(x) component having "starter" functionality, to which additional modular hardware components 134(x) may be added, in various combinations, to increase and/or enhance the functional capabilities. A remote control 132 device may be configured in variety of ways to provide "starter" functionality further discussion of which may be found in relation to FIG. 4.

FIG. 2 further depicts communication module 124 executing on processor 128 of client 104 as including a discovery module 208 and a user interface (UI) manager module 210. Discovery module 208 is representative of functionality to interact with a remote control 132 device to determine which modular hardware components 134(x) are communicatively coupled with the remote control 132 device. For instance, discovery module 208 may be configured to process identifiers 206(x) corresponding to modular hardware components 134(x) when communicated to the client 104 from the remote control 132 device. Based on this processing, discovery module 208 is able make a determination to identify or "discover" which modular hardware components 134(x) are being used with remote control 132 device.

UI manager module 210 represents a variety of functionality operable to output a user interface 130 based on a determination of one or more modular hardware components 134(x). For example, UI manager module 210 may be executed to select, configure, obtain, output, and/or display a user interface 130, based upon which of the modular hardware components 134(x) are determined by the discovery module 208. In an implementation, UI manager module 210 may access a variety of user interface data 212 to configure a user interface 130. For example, UI manager module 210 may use identifiers 206(x) to obtain corresponding user interface data 212 and output a corresponding user interface 130.

FIG. 2 depicts a variety of user interface data 212 as being available from a head end 102 via connection 108. Additionally or alternatively, user interface data 212 may be stored in memory 118 at client 104 (as shown in phantom in FIG. 2), such as being downloaded from the head-end 102 via connection 108, copied from computer-readable media (e.g., a compact disc, flash drive, and so on) to memory 118, and so on. User interface data 212 may even be provided with a modular hardware component 134(x) and be communicated to the client 104 in addition or in lieu of an identifier 206(x).

User interface data 212 may represent a database which matches various combinations of modular hardware components 134(x) with various embodiments of a user interface 130. In particular, user interface data 212 may specify characteristics of a user interface 130 to match the functional capabilities of the one or more determined modular hardware components 134(x). User interface data 212 may include a collection of pre-configured versions of a user interface 130 which may be selected and output by operation of the UI manager module 210. Additionally or alternatively, user interface data 212 may include a variety of data sufficient to form a user interface 130, which may be obtained by the UI manager module 210 to configure and output a user interface 130 based on modular hardware components 134(x). Output of user interface 130 by UI manager module 210 may include causing display of the user interface 130, such as on the illustrated display device.

Figure 3:
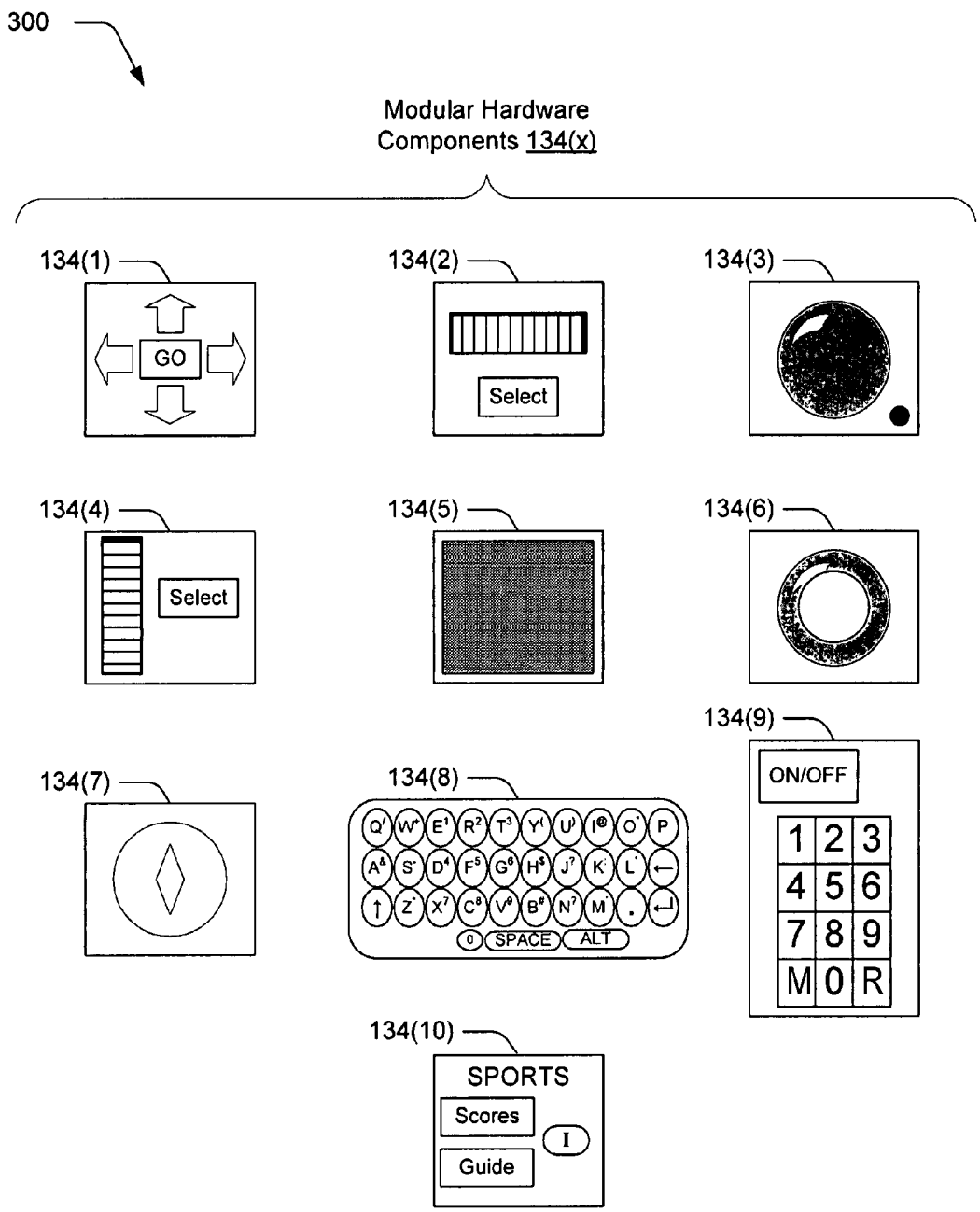
FIG. 3 is an illustration depicting various exemplary embodiments of modular hardware components of FIGS. 1-2 which are connectable to a remote control device.

FIG. 3 is an illustration depicting various exemplary embodiments 300 of modular hardware components 134(x) of FIGS. 1-2 which are connectable to a remote control device. Examples of modular hardware components 134(x) include, but are not limited to, a four-way directional input 134(1) component; a horizontal thumb-wheel 134(2) component; a trackball 134(3) component; a vertical thumb-wheel 134(4) component; a touch-pad 134(5) component; a scroll wheel 134(6) component; a position and motion detection 134(7) component, which for example may use a gyroscope, accelerometer, and/or infrared detection techniques; an alphanumeric keypad 134(8) component; a numeric pad 134(9) component; and a branded or themed 134(10) component further discussion of which may be found in relation to FIG. 8.

A variety of other of modular hardware components 134(x) are also contemplated, examples of which include a game controller; a light pen; an internet component having controls for internet interaction; an audio component having controls to interact with audio content; a video playback component having controls to interact with video content; a vibration or other feedback component; and so on. As noted, each of the described modular hardware components 134(x), when coupled to a remote control 132 device, may add to the functional capabilities of a remote control 132 device. Upon identification of one or more modular hardware components 134(x), a client 104 may output a user interface 130 based upon which modular hardware components 134(x) are identified, examples of which are discussed in relation to FIGS. 5-8.

Figure 4:
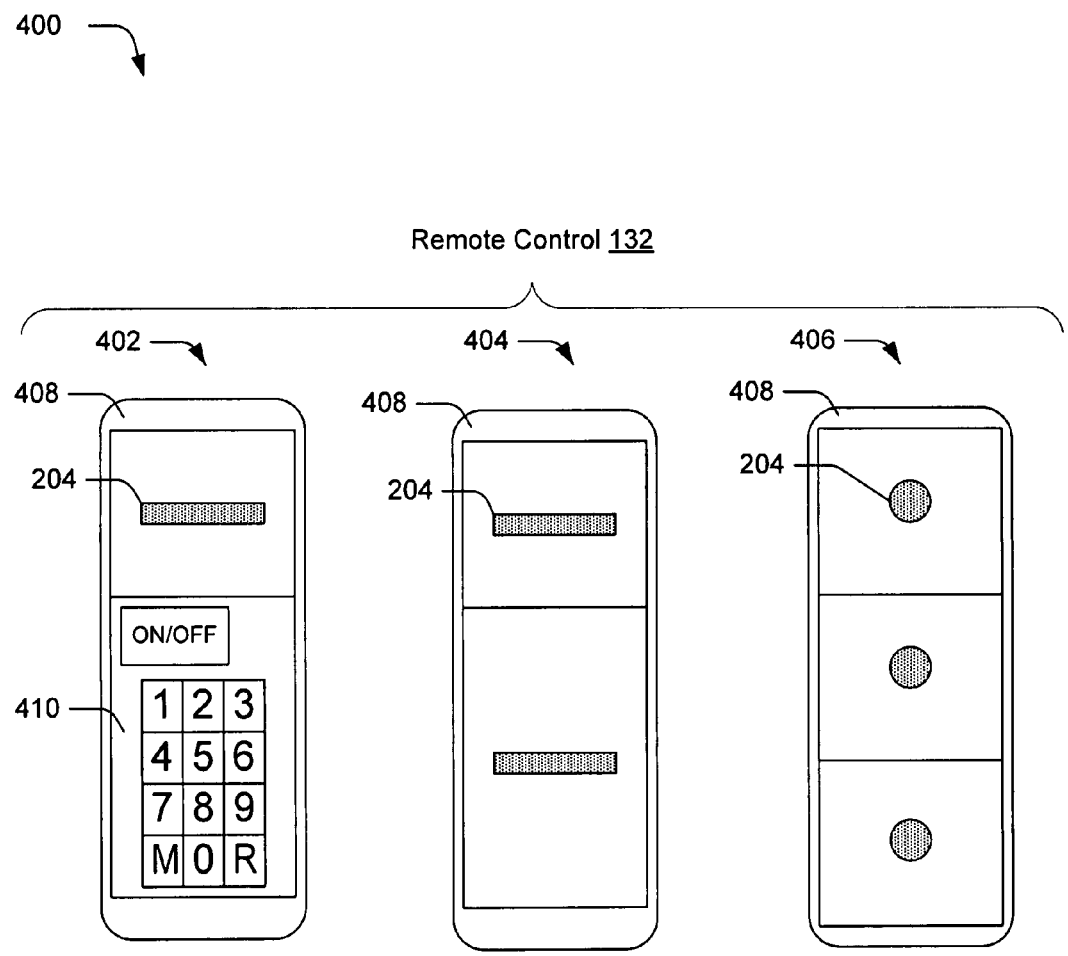
FIG. 4 is an illustration depicting various exemplary embodiments of a remote control device of FIGS. 1-2 which is configured to receive one or more modular hardware components.

FIG. 4 is an illustration depicting various exemplary embodiments 400 of a remote control 132 device of FIGS. 1-2 which is configured to receive one or more modular hardware components. Each of the depicted embodiments 402, 404, 406 of a remote control 132 device may represent a "starter" modular hardware component 134(x) component having "starter" functionality, to which additional modular hardware components 134(x) may be added, as was discussed in relation to FIG. 2. Each of the depicted embodiments 402, 404, and 406 includes a housing 408 which may be configured to receive one or more modular hardware components 134(x). The housing 408 may further include one or more component interfaces 204 to communicatively couple the one or more modular hardware components 134(x) when received. The housing 408 may also include an input/output module 202 and/or other "starter" functionality.

For example, embodiment 402 is illustrated as including one component interface 204 which is implemented as a hardware interface to receive a modular hardware component 134(x) and a base component 410, which in the example is configured as a numeric keypad. The base component 410 represents a fixed and/or non-removable component which may be initially provided with an embodiment 402 of a remote control 132 device to provide starter" functionality. The base component 410 may incorporate an input/output module 202 of FIG. 2 or equivalent functionality.

Embodiments 404 and 406 are each illustrated as including multiple component interfaces 204, and accordingly may receive multiple modular hardware components 134(x). In embodiments 404 and 406, the housing 408 may include an input/output module 202. Alternatively, an input/output module 202 or equivalent functionality may be provided via one of the modular hardware components 134(x) when received in the housing 408. Thus, embodiments 404 and 406 may be configured as a housing 408 to interconnect various modular hardware components 134(x), with or without an input/output module 202 or other "starter" functionality. It is noted that hardware connections provided via the components interfaces 204 may be configured in a variety of ways, as represented by the rectangular and circular component interfaces 204 in embodiments 404 and 406 respectively.

It should be appreciated that a variety of combinations may be formed of a remote control 132 device with modular hardware components 134(x). For example, remote control 132 devices of FIG. 4 may be combined with the exemplary modular hardware components 134(x) of FIG. 3 in many different ways. FIGS. 5-8 illustrate examples of user interfaces 130 which may be output based upon a corresponding exemplary combination of modular hardware components 134(x) with a remote control 132 device.

Exemplary User Interfaces

The following discussion describes exemplary user interfaces that may be output by the previously described exemplary environment, as well as other environments. Thus, although portions of the following discussion may refer to the environment 100 of FIG. 1, system 200 of FIG. 2 and/or devices of FIGS. 3-4, the following discussion should not necessarily be limited to that environment 100, system 200 or devices of FIGS. 3-4.

Figure 5:
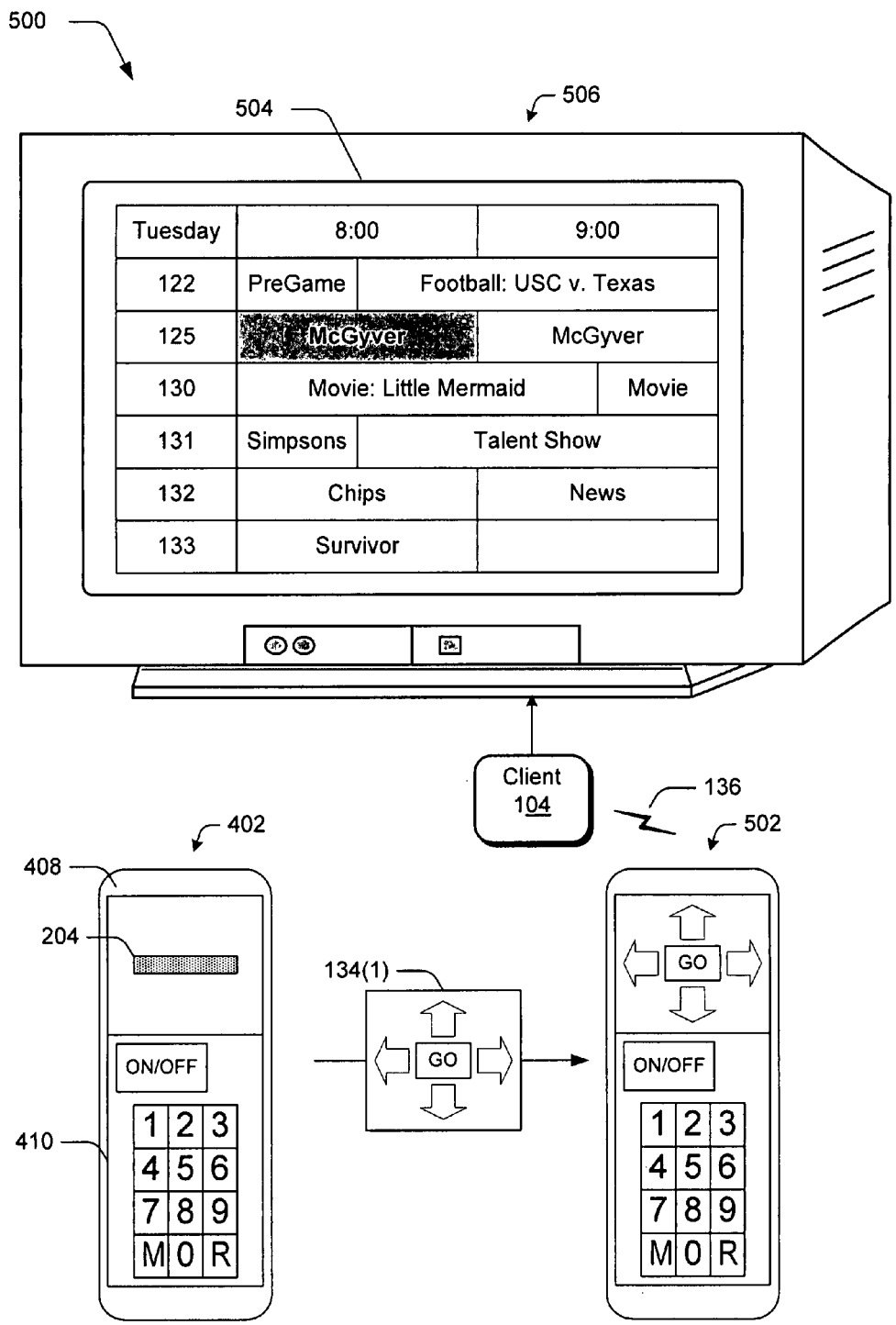
FIG. 5 is an illustration depicting an embodiment of an exemplary EPG which is output based upon a corresponding exemplary combination of a modular hardware component with a remote control device.

FIG. 5 depicts an exemplary embodiment 500 of a combination 502 of a remote control 132 device with a modular hardware component and a corresponding user interface output by a client 104. In this example, the combination 502 is formed by adding a four-way directional input 134(1) component to the embodiment 402 of a remote control 132 device of FIG. 4. Four-way directional input 134(1) component adds directional input functionality to the base component 410 of the embodiment 402 of the remote control 132 device. Accordingly, the user interface 130 output by client 104 may be configured to be responsive to the added functionality. In this example, user interface 130 is illustrated as an EPG 504 which is being displayed on a display device 506. The EPG 504 in this example is configured as a grid which may be suitable for navigation via directional inputs from the four-way directional input 134(1) component. Thus, the output EPG 504 is configured and/or selected to correspond to the four-way directional input 134(1) component and/or the functional capabilities of the four-way directional input 134(1) component.

Figure 6:
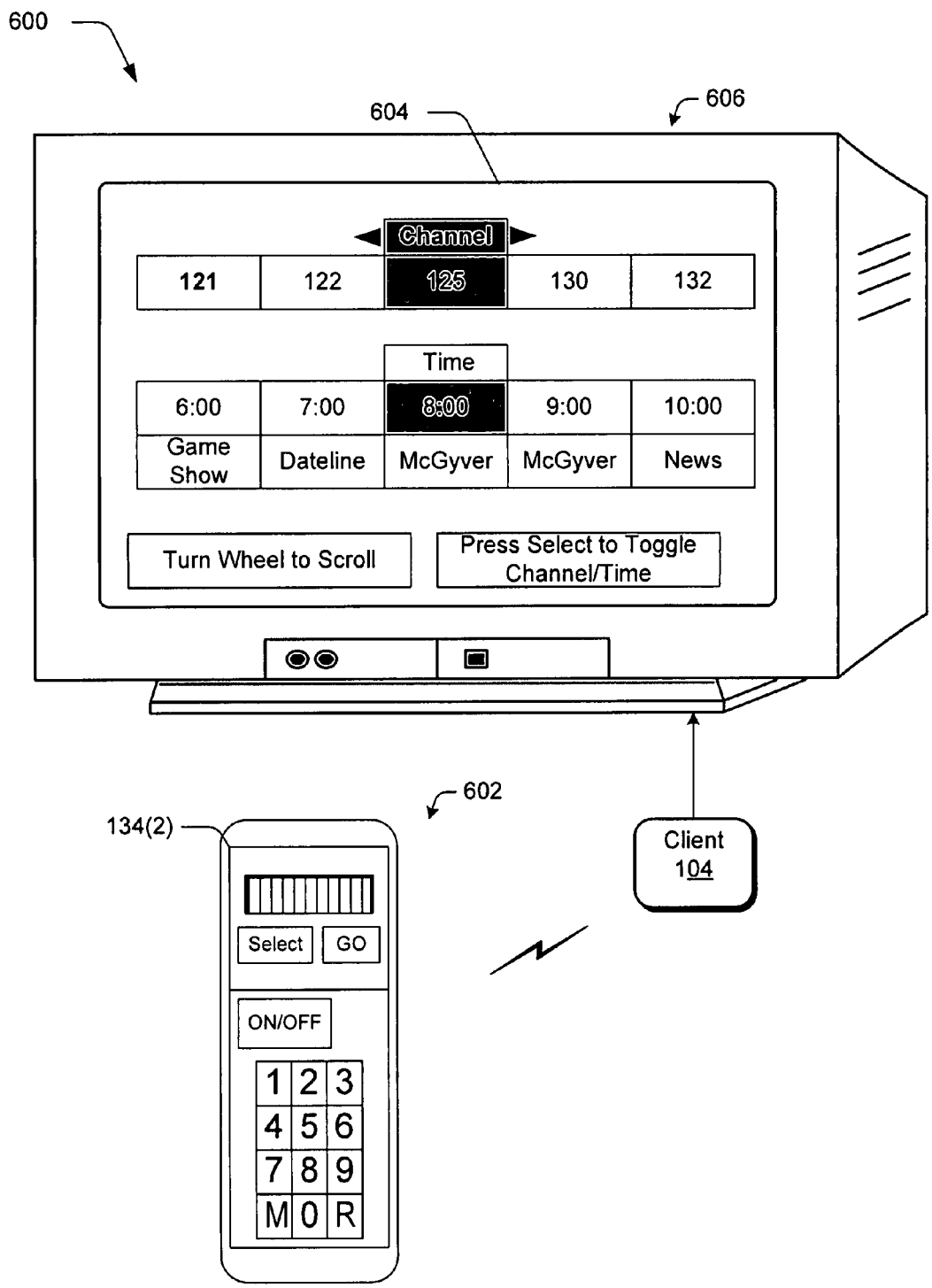
FIG. 6 is another illustration depicting an embodiment of an exemplary EPG which is output based upon a corresponding exemplary combination of a modular hardware component with a remote control device.

FIG. 6 depicts another exemplary embodiment 600 of a combination 602 of a remote control 132 device with a modular hardware component and a corresponding user interface output by a client 104. In this example, the combination 602 is formed by adding a horizontal thumb-wheel 134(2) component to the embodiment 402 of a remote control 132 device of FIG. 4. Horizontal thumb-wheel 134(2) component adds horizontal rotational input functionality to the base component 410 of the embodiment 402 of a remote control 132 device. Accordingly, a user interface 130 output by client 104 may be configured to be responsive to the added functionality.

In this example, user interface 130 is again configured as an EPG 604 which is being displayed on a display device 606. Here, the EPG 604 is arranged to be suitable for input from Horizontal thumb-wheel 134(2) component. It is noted that the EPG data 122(d) used to produce EPG 604 of FIG. 6 and EPG 504 of FIG. 5 may be the same. However, the presentation and operation of the EPG 604 and EPG 504 are modified according to which modular hardware components 134(x) are used to interact with the client 104.

For instance, the channel bar in EPG 604 may be scrolled (e.g., left and right) using the horizontal thumb-wheel 134(2) component to select a channel. A time window may be independently selected in the time bar, again by scrolling. Programming data is presented in a row which may match a selected channel and time window. Vertical navigation may be minimized to match the capabilities of the horizontal thumb-wheel 134(2) component. If instead of the horizontal thumb-wheel 134(2) component, a vertical thumb-wheel 134 (4) component was discovered by a client 104, then EPG 604 may correspondingly be configured in a vertical arrangements and horizontal navigation may be minimized to match the functional capabilities of the vertical thumb-wheel 134(2) component.

Figure 7:
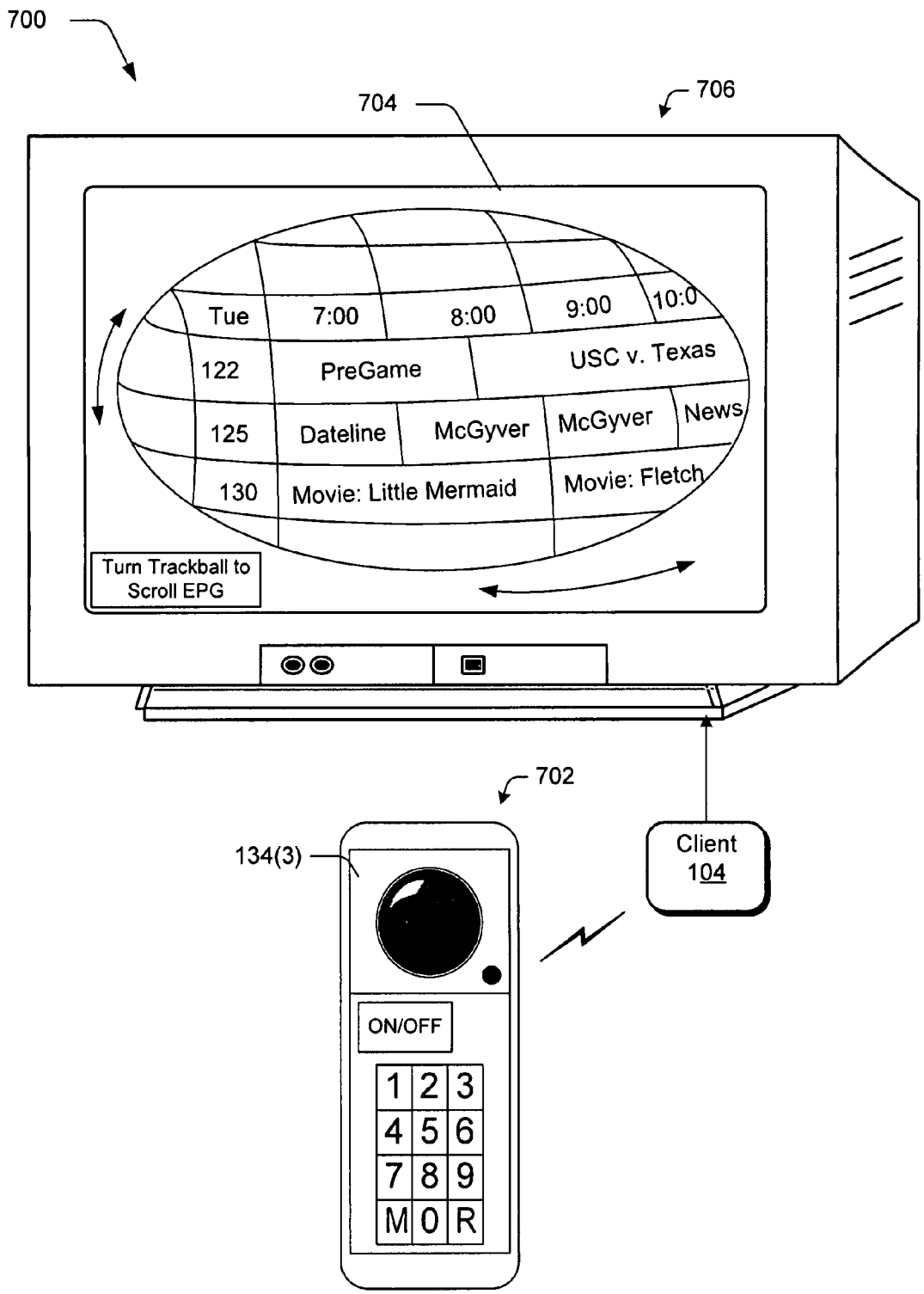
FIG. 7 is another illustration depicting an embodiment of an exemplary EPG which is output based upon a corresponding exemplary combination of a modular hardware component with a remote control device.

FIG. 7 depicts another exemplary embodiment 700 of a combination 702 of a remote control 132 device with a modular hardware component and a corresponding user interface output by a client 104. In this example, the combination 702 is formed by adding a trackball 134(3) component to the embodiment 402 of a remote control 132 device of FIG. 4. Trackball 134(3) component adds rotational input functionality to the base component 410 of the embodiment 402 of a remote control 132 device. Accordingly, the user interface 130 output by the client 104 may be configured to be responsive to the added functionality.

In this example, user interface 130 is again configured as an EPG 704 which is being displayed on a display device 706. Here, the EPG 704 is arranged to be suitable for input from trackball 134(3) component. In particular, the EPG 704 is arranged as a spherical interface which may rotate in response to rotational input from the trackball 134(3) component. Thus, the presentation and operation of the EPG 704 is configured according to the trackball 134(3) component used to interact with the client 104. Again, the EPG data 122(d) used to produce EPG 704 of FIG. 7 may be the same as the data used to produce EPG 504 and EPG 604 of FIGS. 5 and 6, respectively.

It is noted that not only may a user interface 130 match the functional capabilities of a modular hardware component 134(x), but other characteristics as well. For instance, the spherical EPG 704 matches the spherical shape of the trackball 134(3) component. In another example, a triangular modular hardware component 134(x) may result in a triangular user interface 130. Further, other characteristics such as colors, themes, shapes, font choices, images or logos, may be incorporated in a user interface 130 to match characteristics of a modular hardware component 134(x) used to interact with a client 104.

Figure 8:
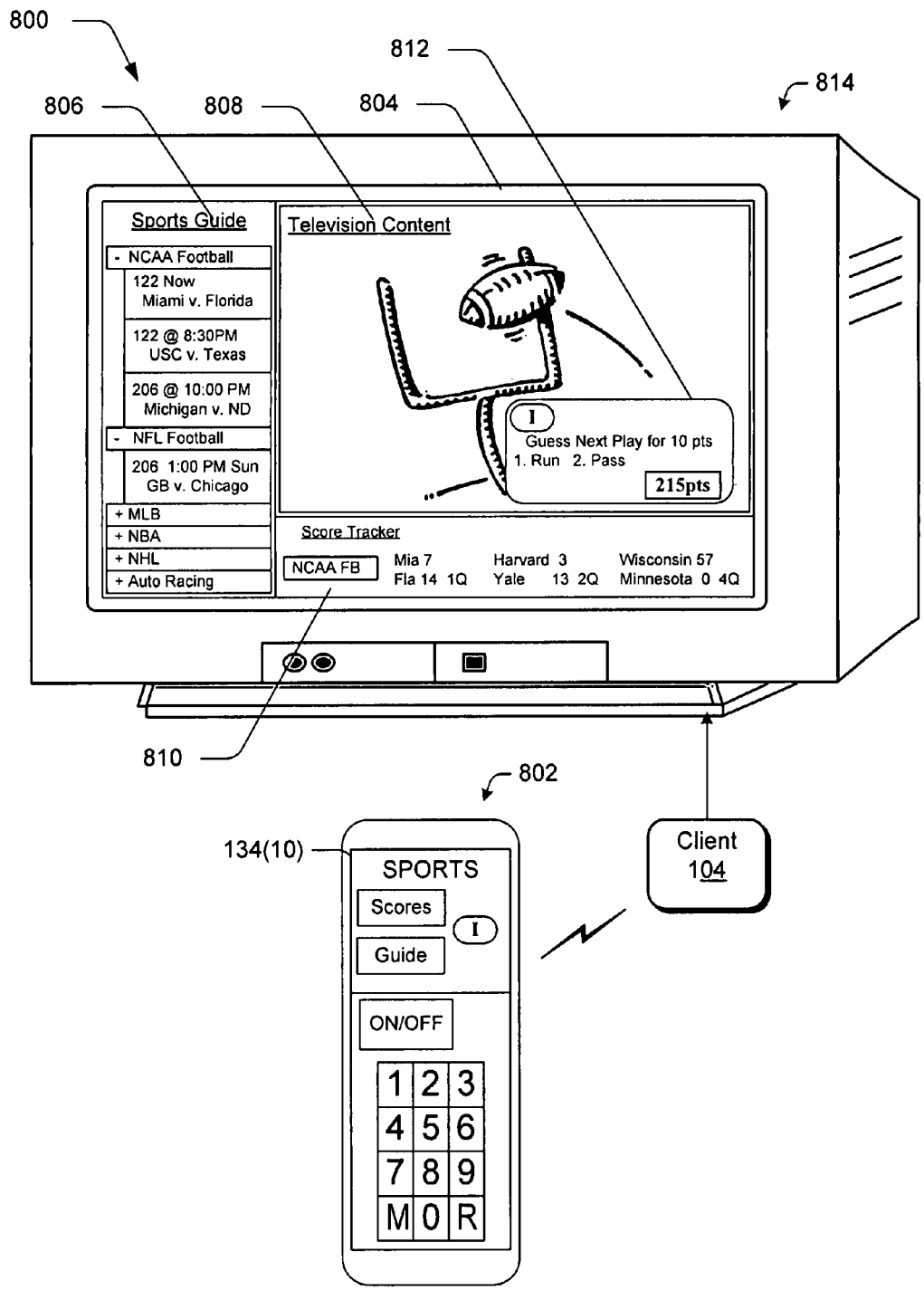
FIG. 8 is an illustration depicting an embodiment of an exemplary user interface to view and interact with television content which is output based upon an identification of a modular hardware component with a remote control device.

FIG. 8 depicts another exemplary embodiment 800 of a combination 802 of a remote control 132 device with a modular hardware component and a corresponding user interface output by a client 104. In this example, the combination 802 is formed by adding a themed 134(10) component to the embodiment 402 of a remote control 132 device of FIG. 4. The themed 134(10) component may cause output of a user interface 130 for viewing television content 120(c) which is customized based upon the themed 134(10) component. In the illustrated example, themed 134(10) component is configured to provide a user interface 804 according to a "sports" theme.

The user interface 804 includes a guide 806 portion; a content viewing 808 portion; a data 810 portion and an interactive content 812 portion which are illustrated as being displayed on a display device 814. Inclusion of the themed 134(10) component with a remote control 132 device may automatically cause the user interface 804 to be configured accordingly to the theme. In the illustrated "sports" theme example, guide 806 portion displays EPG data 122(d) which may be automatically searched or focused to sports related programming. Further, the data 810 portion shows sports scores, which may also be automatically displayed.

Additionally or alternatively, operation of the themed 134 (10) component may expose or hide the various portions of the user interface 804. For example, pressing the "Scores" button may open or close the data 810 portion. In another example, interactive content 812 portion may be operable via the "1" button of themed 134(10) component. An indication that television content 120(c) includes interactive content may be displayed in the content viewing 808 portion, e.g., an on screen alert. Then, when a user operates the "1" button, the interactive content 812 portion may appear. In the depicted example, interactive content 812 portion is configured as an interactive game related to the sports programming being viewed in the content viewing 808 portion.

A variety of themes other than a sports theme are contemplated for a themed 134(10) component. For example a "movie" themed 134(10) component may cause guide 806 portion to show EPG data 122(d) which may be automatically searched for movie programming. In the movie theme example, interactive content 812 portion may provide a movie trivia game. Further, data 810 portion may show production notes, movie facts, actor information, scene information and so forth related to a movie being viewed in the content viewing portion 808. Other examples of themes included news, children, cooking, fitness, home improvement, drama, and so on.

In another example the themed 134(10) component may be a branded product such as to a particular sports network, news network, home supply retailer, and so on. In this example, the themed 134(10) component may cause configuration of a user interface, such as interface 804, according to the branded theme. For instance, for a sports network themed 134(10) component, guide 806 portion may show programming on the sports network; content viewing portion may be auto tuned to a channel of the sports network; data 810 portion may display a news feed from the sports network; and so on. Interactive content 812 portion might provide sports trivia from the sports network. Similarly, for an new network themed 134 (10) component, guide 806 portion may show programming on a family of channels associated with the news network; content viewing portion may be to the news network; data 810 portion may display a news feed of the news network; and so on. A themed component 134(10) may be operable by a user to access and interact with the themed aspects such as exposing or hiding portions of the user interface 804, selecting interactive content, and so forth.

Figure 9:
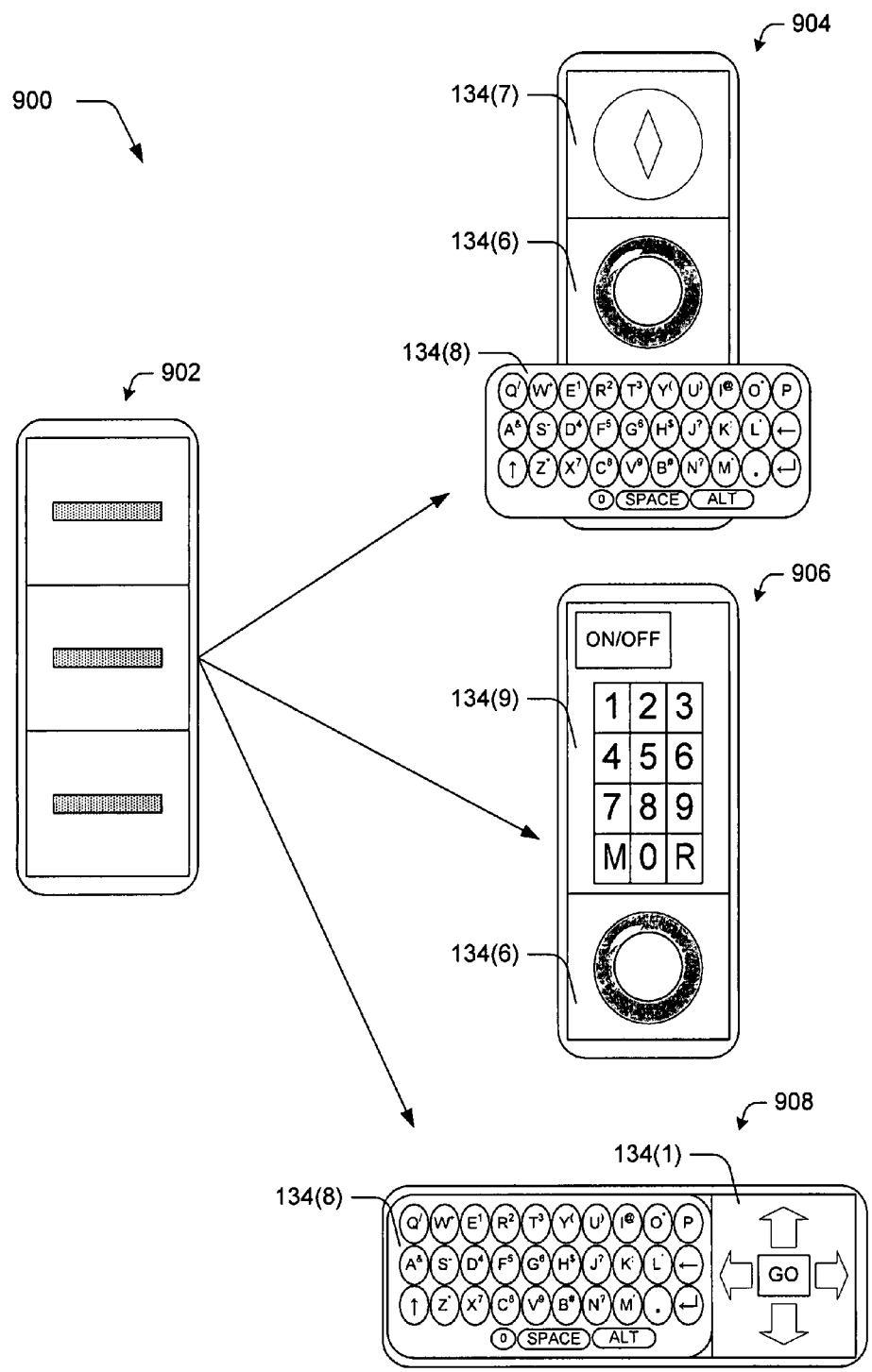
FIG. 9 is an illustration depicting various exemplary combinations formed from a remote control device having multiple interfaces connectable to various exemplary modular hardware components.

FIG. 9 is an illustration of an exemplary embodiment 900 depicting multiple combinations which may be formed using the same remote control device. For example, an embodiment 902 of a remote control 132 device may be used to form a variety of combinations by coupling to different modular hardware components 134(x) at different times. FIG. 9 illustrates three exemplary combinations 904, 906 and 908 that may be formed from the embodiment 902 of a remote control 132 device and exemplary modular hardware components 134(x) of FIG. 3. Combination 904 includes the position and motion detection 134(7) component, the scroll wheel 134(6) component, and an alphanumeric keypad 134(8) component. Combination 906 includes the numeric pad 134(9) component and the scroll wheel 134(6). Combination 908 includes the alphanumeric keypad 134(8) component and the four-way directional input 134(1) component. Combination 908 further illustrates that the orientation of a remote control 132 device and/or modular hardware components 134(x) may be changed, such as changing from lengthwise orientation to widthwise orientation.

Each combination 904, 906, 908 may result in a different respective user interface 130 being configured and/or output by a client 104. For instance, a user interface 130 corresponding to combination 904 may be responsive to motion input due to inclusion of position and motion detection 134(7) component, while user interfaces 130 corresponding to combinations 906, 908 do not respond to motion. EPG search functionality of a user interface 130 for combination 908 may provide a textual input box for direct input of search terms based on inclusion of alpha-numeric keypad 134(8) component, while EPG search functionality for combination 906 may involve categories, list, or other techniques which are more suited to the numeric pad 134(9) component than direct input of search terms. A variety of other combinations and examples are also contemplated.

From the foregoing discussion, it should be apparent that a wide variety of modular hardware components 134(x) and corresponding user interfaces 130 are contemplated and therefore are not limited to the examples of FIGS. 3-9.

Exemplary Procedure

The following discussion describes techniques related to configuration of a user interface corresponding to one or more modular hardware components of a remote control device that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1, the system 200 of FIG. 2, and the examples of FIGS. 3-8.

Figure 10:
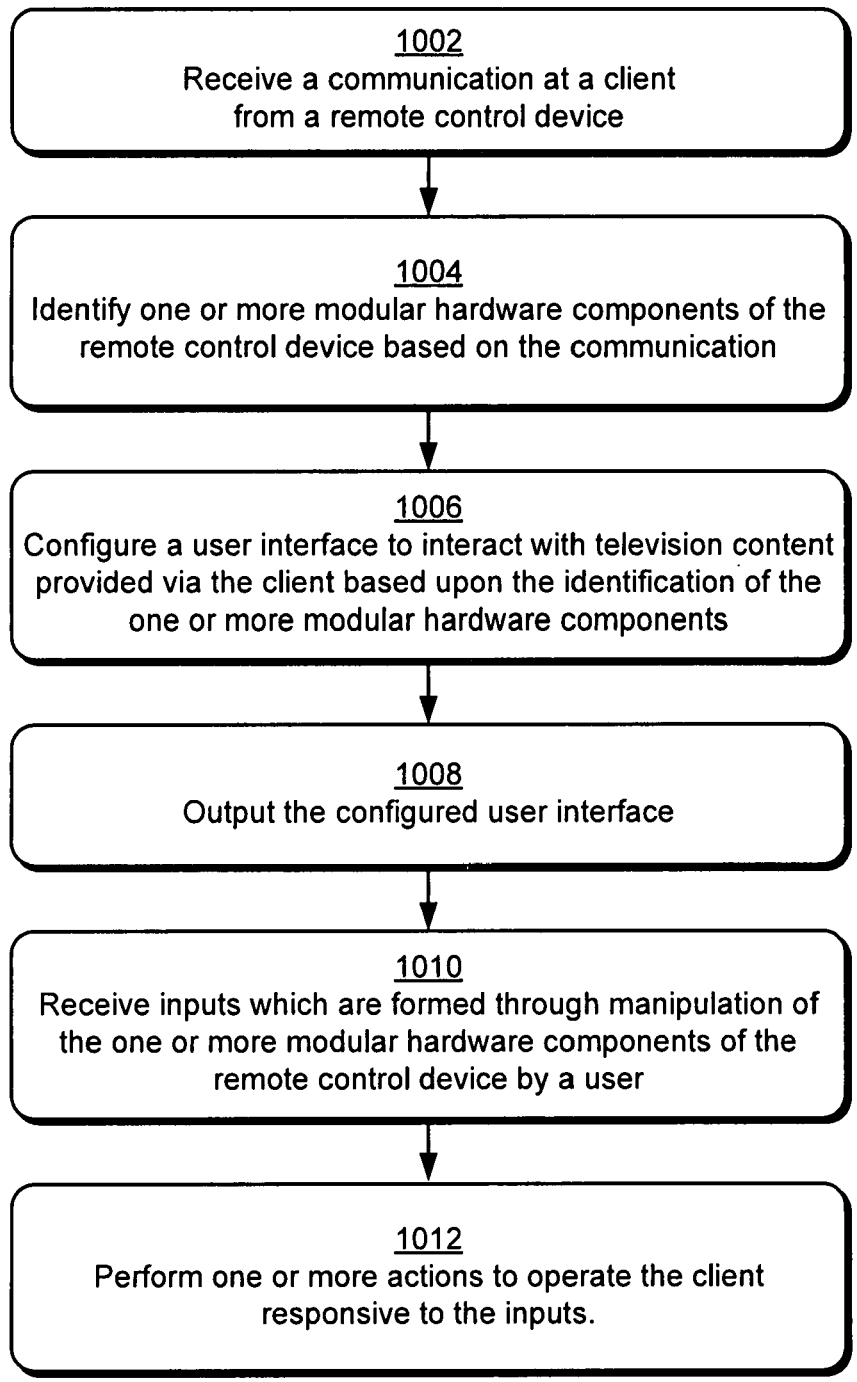
FIG. 10 is a flow diagram depicting a procedure in an exemplary implementation in which a user interface to interact with television content provided via a client is configured based upon an identification of one or more modular hardware components of a remote control device.

FIG. 10 is a flow diagram depicting a procedure 1000 in an exemplary implementation in which a user interface to interact with television content provided via a client is configured based upon an identification of one or more modular hardware components of a remote control device. The user interface may then be output and operated through user manipulation of the one or more modular hardware components.

A communication is received at a client from a remote control device (block 1002). For example, a remote control 132 device of FIG. 2 having one or more modular hardware components 134(x) may interact with the client 104. For instance, a user may manipulate the remote control 132 device to "power on" the client 104 which causes a "power on" command to be communicated to the client 104, such as via connection 136. A variety of other commands to operate a client 104 may be communicated between a remote control 132 device and a client 104. In another example, the remote control 132 device may transmit a communication to a client 104 when one or more modular components 134(x) are connected or disconnected.

One or more modular hardware components of the remote control are identified based on the communication (block 1004). Continuing with the previous example, the communication received by client 104 may include one or more identifiers 206(x) each corresponding to a respective modular hardware component 134(x) of the remote control 132 device. Identifiers 206(x) may be automatically provided, such as when the "Power On" command is communicated. Additionally or alternatively, remote control 132 device may configure a communication to include identifiers 206(x), when one or more modular hardware components 134(x) are connected or disconnected. Client 104 may receive and process the communication with identifiers 206(x) to determine which modular hardware components 134(x) are being used with the remote control 132 device.

In an implementation, an interface 204 connected to a modular hardware component 134(x) may be configured to obtain a corresponding identifier 206(x) and provide the identifier 206(x) to input/output module 202 of the remote control 132 device for inclusion in a communication to the client 104. Input/output module 202 may then operate to transmit the communication to the client 104. Identifiers 206(x) may configured in various ways such as unique numbers, product codes, user interface data 212, or other data which is suitable to identify a corresponding modular hardware component 134(x).

A discovery module 208 or equivalent functionality of the client 104 may process the received communication and use the included identifier 206(x) to determine which of a plurality of available modular hardware components 134(x) are being used with the remote control 132 device. Naturally, multiple identifiers 206(x) corresponding to multiple modular hardware components 134(x) may be provided in one or more communications. Thus, discovery module 208 may identify one or more modular hardware components 134(x) of a remote control 132 device based on the one or more communications.

A user interface to interact with television content provided via the client is configured based upon the identification of the one or more modular hardware components (block 1006). A variety of user interfaces 130 may be configured based upon which modular hardware components 134(x) are identified as being used with a remote control 132 device, examples of which are provided in FIGS. 5-8. A UI manager module 210 of client 104 may be executed at the client 104 to manage, select, configure, and/or output a variety of user interfaces 130 which are based upon which modular hardware components 134(x) are used with the remote control 132 device. For example, UI manager module 210 may obtain user interface data 212 from head end 102 or local memory 118 to configure a user interface 130 based upon identification of modular hardware components 134(x) by the discovery module 208. UI manager module 210 may also manage and select preconfigured user interfaces 130 which may be stored in memory 118 based upon an identification.

For instance, an EPG 504 may be configured to arrange EPG data 122(d) in a grid format when a four-way directional input 134(1) component as shown in FIG. 5 is identified. The same EPG data 122(d) may be arranged in horizontally scrollable rows, such as in the EPG 604 of FIG. 6, when the four-way directional input 134(1) component is interchanged with a horizontal thumb-wheel 134(2) component. When a different modular hardware component 134(x) is identified, the user interface 130 is configured to match the modular hardware component 134(x) and/or functional capabilities of the modular hardware component 134(x).

Thus, when an alphanumeric keypad 134(8) component is identified, the user interface 130 may be configured with functionality to accept textual inputs. When a position and motion detection 134(7) component is identified, the user interface 130 may be configured to with functionality to respond to position and motion inputs, such as a velocity input generated by user manipulation of the position and motion detection 134(7) component. Configuration of a user interface 130 to view television content 120(c) is also contemplated, such as the example discussed with respect to FIG. 8. A user interface 130 to display television content 120(c) may or may not include capabilities to display EPG data 122(d) concurrently with the television content 120(c). A variety of other examples are also contemplated.

The configured user interface is then output (block 1008), such as by displaying the user interface on a display device. A user may then view the configured user interface, such as user interface 804 shown in FIG. 8 and interact with displayed television content 120(c) and/or EPG data 122(d). For instance, a user may manipulate the "1" button of the themed 134(10) component in FIG. 8, to toggle the display of an interactive content 812 portion, or depress the "scores" button to display the data 810 portion. In another example, a user may manipulate the trackball 134(3) component of FIG. 7 to interact with EPG data 122(d) presented in the spherical EPG 704.

Inputs are received which are formed through manipulation of the one or more modular hardware components of the remote control device by a user (block 1010). For example, a user may navigate a displayed EPG 704 through the manipulation of the trackball 134(3) component in the preceding example. A user's manipulation of the modular hardware component 134(x) (e.g., the trackball 134(3) component) causes remote control 132 device to communicate with the client 104. For instance, inputs may be formed and communicated through operation of the input/output module 202 of FIG. 2. Communication module 124 of a client 104 or equivalent functionality may operate to receive the inputs formed through manipulation of the one or more modular hardware components 134(x).

One or more actions to operate the client are performed responsive to the inputs (block 1012). For instance, inputs formed through manipulation of the trackball 134(3) component in the preceding example may cause navigation through the EPG 704 of FIG. 7, such as rotation of the EPG 704, selection of particular programming, and so on. In another example, user manipulation of the themed 134(10) component of FIG. 8 may cause a guide 806 portion or data 810 portion of the user interface 804 to be toggled. Thus, a particular modular hardware component 134(x) may be identified and the identification used to configure a corresponding user interface 130. The user interface 130 may include functionality which corresponds to the functional capabilities of the particular modular hardware component 134(x) and which is operable through manipulation of the particular modular hardware component 134(x) by a user. Thus, the user interface 130 configured according to the described techniques may permit a variety of custom interactions of a user with television content 120(c) and or EPG data 122(d) which may be accessed via a client 104.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
identifying, by a television client device, a first combination of one or more modular hardware components interconnected to form a remote control device that are configured to provide inputs to control operation of the television client device to output television content, the one or more modular hardware components being interchangeably combinable in different combinations one to another and with other modular hardware components to form the remote control device;
configuring a user interface with functionality to interact with the television content at the television client device according to the identified first combination of the one or more modular hardware components;
identifying, by the television client device, a second combination of the one or more hardware components in response to the remote control device being reconfigured from the first combination to the second combination to form the remote control; and
modifying, in response to identifying the second combination, the user interface with different functionality to interact with the television content at the television client device according to the identified second combination of the one or more modular hardware components, wherein the modifying the user interface with different functionality includes: detecting a themed component of the identified second combination of the one or more modular hardware components and customizing the user interface to enable one or more aspects corresponding to a theme associated with the detected themed component including at least automatically performing a search of guide data to find programming corresponding to the theme.

2. A method as described in claim 1, wherein the television content includes electronic programming guide (EPG) data and the user interface is configured as an EPG.

3. A method as described in claim 2, wherein one said modular hardware component that is identified includes functionality operable by a user to navigate the EPG.

4. A method as described in claim 1, wherein identifying includes receiving a communication from the remote control device having one or more identifiers which correspond to the one or more modular hardware components of the remote control device.

5. A method as described in claim 1, wherein the user interface is configured to include functionality that corresponds to at least one said modular hardware component and is operable by manipulation of the at least one said modular hardware component by a user.

6. A method as described in claim 1, wherein the configuring of the user interface and the modifying of the user interface include obtaining user interface data from storage based upon the identified one or more modular hardware components.

7. A method as described in claim 1, wherein the configuring of the user interface includes selecting a first combination of one or more pre-configured user interfaces from storage based upon the identified first combination of the one or more modular hardware components and the modifying of the user interface includes selecting a second combination of the one or more pre-configured user interfaces from storage based upon the identified second combination of the one or more modular hardware components to form the remote control.

8. A method as described in claim 1, further comprising outputting the user interface; and
receiving inputs to operate the user interface, the inputs formed through user manipulation of the one or more modular hardware components used to form the remote control.

9. A method as described in claim 1, wherein:
one said modular hardware component that is identified adds to the functional capability of the remote control device; and
the user interface is configured with functionality that corresponds to the functional capability added by the one said modular hardware component.

10. A method as described in claim 1, wherein:
one said modular hardware component is a themed component; and
the configuring of the user interface is performed to correspond to a theme of the themed component.

11. A remote control device comprising:
a housing configured to receive at least a first and second modular hardware component, the first and second modular hardware components configured to be interchangeably connected with the housing and one or more other modular hardware components to form the remote control device; and
a module to communicate at least a first and second identifier corresponding respectively to the first and second modular hardware components to a client when the first and second modular components are connected to the housing, the first and second identifiers being used by the client to:
identify the first and second modular hardware components; and
configure an electronic programming guide (EPG) to include a first and second functionality corresponding respectively to the first and second modular hardware components, the first functionality operable through manual manipulation of the first modular hardware component by a user, and the second functionality operable through manual manipulation of the second modular hardware component by a user, including at least causing guide data presented via the electronic programming guide (EPG) to change from a first theme associated with the first modular hardware component to a second theme associated with the second modular hardware component by automattically searching the guide data to find programming corresponding to the second theme when the first modular hardware component is interchanged with the second modular hardware component.

12. A remote control device as described in claim 11, wherein the module communicates the first identifier automatically when the first modular hardware component is received by the housing and the second identifier automatically when the second modular hardware component is received by the housing.

13. A remote control device as described in claim 11, wherein the housing is configured to receive a plurality of said modular hardware components.

14. A remote control device as described in claim 11, further comprising a component interface to couple the first and second modular hardware components to the housing and communicate the first identifier between the first modular hardware component and the module and the second identifier between the second modular hardware component and the module.

15. One or more computer-readable memory devices comprising executable instructions stored thereon that, when executed by a client direct client to:
determine that a first combination of one or more modular hardware components configured to provide inputs to the client is coupled to a remote control device interacting with the client, the one or more modular hardware components being interchangeably combinable one to another to form the remote control device;
configure a user interface with functionality for output by the client according to the determined first combination of one or more modular hardware components;
determine that a second combination of the one or more modular hardware components is coupled to the remote control device in response to the remote control device being reconfigured from the first combination to the second combination to form the remote control;
modify the user interface with different functionality for output by the client according to the determined second combination of the one or more modular hardware components in response to the determination that the second combination is coupled to the remote control device, wherein the modification of the user interface with different functionality includes: detecting a themed component of the determined second combination of the one or more modular hardware components and customizing the user interface to present guide data that is automtically focused to programming corresponding to a theme associated with the detected themed component.

16. One or more computer-readable memory devices as described in claim 15, wherein the one or more modular hardware components are manipulable by a user to provide the inputs when coupled to the remote control device.

17. One or more computer-readable memory devices as described in claim 15, wherein the user interface is configured to include an electronic programming guide (EPG) which is navigable through user manipulation of the one or more modular hardware components.

18. One or more computer-readable memory devices as described in claim 15, wherein the determining is based on a communication received from the remote control device having an identifier corresponding to each of the one or more modular hardware components that are coupled to the remote control device.

19. One or more computer-readable memory devices as described in claim 15, wherein configuration and modification of the user interface includes accessing user interface data corresponding respectively to the determined first combination and second combination of the one or more modular hardware components from a head end.

20. One or more computer-readable memory devices as described in claim 15, wherein one of the determined modular hardware components adds a functional capability to the remote control device and the user interface is configured to include functionality corresponding to the added functional capability.

* * * * *

UNITED STATES PATENT AND TRADEMARK OFFICE
CERTIFICATE OF CORRECTION

| | | |
|---|---|---|
| PATENT NO. | : 8,037,493 B2 | Page 1 of 1 |
| APPLICATION NO. | : 11/811672 | |
| DATED | : October 11, 2011 | |
| INVENTOR(S) | : Charles J. Migos | |

It is certified that error appears in the above-identified patent and that said Letters Patent is hereby corrected as shown below:

In column 17, line 50-51, in Claim 11, delete "automattically" and insert -- automatically --, therefor.

In column 18, line 9, in Claim 15, after "direct" insert -- the --.

In column 18, line 33-34, in Claim 15, delete "automtically" and insert -- automatically --, therefor.

Signed and Sealed this
Third Day of January, 2012

David J. Kappos
*Director of the United States Patent and Trademark Office*